(12) United States Patent
Mabeck et al.

(10) Patent No.: US 8,183,757 B2
(45) Date of Patent: May 22, 2012

(54) DISPLAY ELEMENT

(75) Inventors: Jeffrey Todd Mabeck, Corvallis, OR (US); Niranjan Thirukkovalur, Westborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 163 days.

(21) Appl. No.: 12/830,581

(22) Filed: Jul. 6, 2010

(65) Prior Publication Data

US 2012/0007487 A1    Jan. 12, 2012

(51) Int. Cl.
*H01J 1/62* (2006.01)
(52) U.S. Cl. .......................... 313/483; 313/506
(58) Field of Classification Search .............. 313/483, 313/498, 506
See application file for complete search history.

(56) References Cited

U.S. PATENT DOCUMENTS

| 5,633,103 | A | 5/1997 | DeMarco et al. |
| 6,130,774 | A | 10/2000 | Albert et al. |
| 6,741,385 | B2 | 5/2004 | Ikeda et al. |
| 6,781,745 | B2 | 8/2004 | Chung et al. |
| 6,822,783 | B2 | 11/2004 | Matsuda et al. |
| 2009/0173899 | A1 | 7/2009 | Sayag |
| 2009/0291388 | A1 | 11/2009 | Assefa et al. |

FOREIGN PATENT DOCUMENTS

| JP | 128688 | 5/1995 |
| JP | 20020057231 | 7/2002 |
| WO | 2008010163 | 1/2008 |

*Primary Examiner* — Vip Patel

(57) ABSTRACT

In one embodiment, a display element includes a first electrode, a second electrode, and a dielectric layer on the second electrode. The dielectric layer has recess regions therein. The display element includes an opaque layer on the second electrode within each recess region and a fluid with colorant particles between the first electrode and the second electrode.

13 Claims, 6 Drawing Sheets

DISPLAY ELEMENT

BACKGROUND

Electrokinetic display systems are electro-optical information displays that form visible images using one or more of electrophoresis, electroconvection, electrochemical interaction and/or other electrokinetic phenomena. The display systems may have a plurality of states, including a transparent (or clear) state and a colored (or dark) state. For example, electro-optical display systems that use electrophoretic phenomena to translate or move colorant particles may collect the particles at least substantially out of the viewing area of the display system in reservoir regions to provide a transparent state. The colorant particles also may be spread across the viewing area of the display to provide a colored state. When the colorant particles are collected in the reservoir regions, the colorant particles may tint the visible areas. The tint caused by the colorant particles may prevent a neutral white or clear optical state for the displays. Also, for a stacked multi-color display, the tint caused by the colorant particles in one layer may affect the perceived color modulated by other layers in the display.

DETAILED DESCRIPTION

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "electro-optical display" is an information display that forms visible images using one or more of electrophoresis, electro-convection, electrochemical interactions, and/or other electrokinetic phenomena.

Embodiments provide an electro-optical display that provides a neutral white or clear optical state that is not tinted by the colorant particles. To prevent the tinting, a black or opaque mask structure is self-aligned within the reservoir regions of the electro-optical display such that the opaque mask structure is only present in the regions where the colorant particles are collected in the clear optical state. By providing the opaque mask structure only in the regions where the colorant particles are collected, the clear aperture of the electro-optical display is improved. By using the self-aligned opaque mask, stacked full color electro-optical displays having a bright, neutral white state and precise color control can also be achieved. In addition, the process for providing the opaque mask structure is compatible with plastic roll-to-roll processing.

Figure 1A:
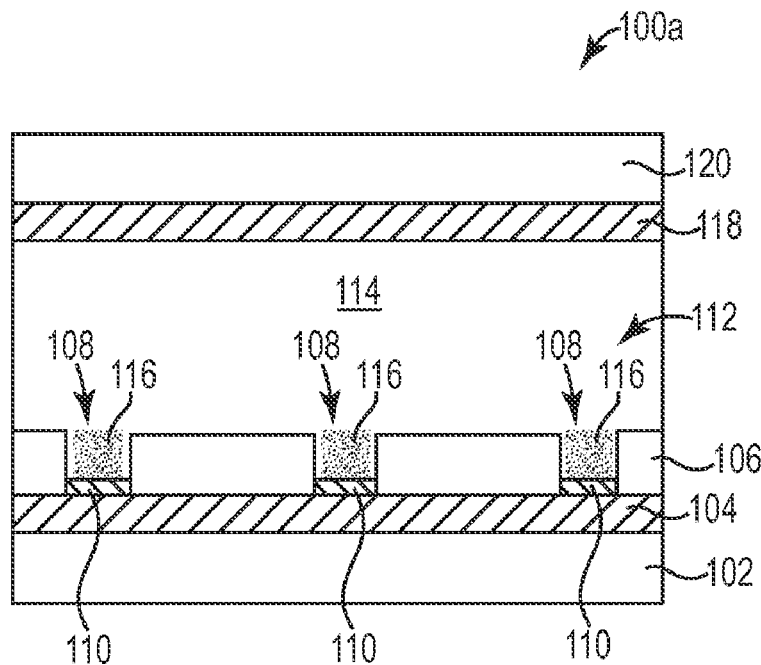
FIG. 1A illustrates a cross-sectional view of one embodiment of an electro-optical display in a clear optical state.

FIG. 1A illustrates a cross-sectional view of one embodiment of an electro-optical display 100a in a clear optical state. Electro-optical display 100a includes a first substrate 102, a first electrode 104, a dielectric layer 106 including reservoir or recess regions 108, opaque layers 110, a display cell 112, a second electrode 118, and a second substrate 120. Display cell 112 is filled with a carrier fluid 114 with colorant particles 116.

First substrate 102 is parallel to and opposite second substrate 120. In one embodiment, first substrate 102 and/or second substrate 120 include a reflective material or an optically clear or transparent material, such as plastic (e.g., polyethylene terephthalate (PET)), glass, or other suitable material. In another embodiment, substrate 102 is coated with or comprises a reflective material. In yet another embodiment, substrate 102 is an opaque material. In still another embodiment, a light scatterer is formed on substrate 102.

First electrode 104 is a continuous, blanket, or solid plate electrode formed on first substrate 102. In other embodiments, first electrode 104 is a segmented or pixilated electrode. In one embodiment, first electrode 104 is transparent. Second electrode 118 is a continuous, blanket, or solid plate electrode formed on second substrate 120. In other embodiments, second electrode 118 is a segmented or pixilated electrode. Second electrode 118 may be transparent or opaque. In one embodiment, first electrode 104 and/or second electrode 118 are formed from a film of transparent conductive material. The transparent conductive material can include carbon nanotube layers, a transparent conducting oxide such as ITO (Indium Tin Oxide), or a transparent conducting polymer such as PEDOT (poly 3,4-ethylenedioxythiophene). Other embodiments use other materials that provide suitable conductivity and transparency for electro-optical display 100a.

Dielectric layer 106 is formed on first electrode 104 and includes a transparent dielectric material. Dielectric layer 106 is structured with recess regions 108 that allow charged colorant particles 116 to collect and compact on opaque layers 110 in response to a suitable bias being applied to first electrode 104 with respect to second electrode 118.

Opaque layers 110 are self-aligned and formed within each recess region 108 on first electrode 104. The thickness of opaque layers 110 is less than the thickness of dielectric layer 106. In one embodiment, opaque layers 110 are metal layers, such as Ni, Cu, Au, Pd, or other suitable metal layers that are electroplated onto first electrode 104 within recess regions 108. In another embodiment, the portions of first electrode 104 within recess regions 108 are anodized, which provides opaque layers 110 and passivation for first electrode 104. In another embodiment, opaque layers 110 are plated dielectric layers that prevent direct electrical contact between first electrode 104 and carrier fluid 114 with colorant particles 116.

Carrier fluid 114 within display cell 112 includes either polar fluids (e.g., water) or nonpolar fluids (e.g., dodecane). In other embodiments, anisotropic fluids such as liquid crystal is used. The fluid may include surfactants such as salts, charging agents, stabilizers, and dispersants. In one embodiment, the surfactants provide a fluid that is an electrolyte that is able to sustain current by ionic mass transport.

Colorant particles 116 in carrier fluid 114 are comprised of a charged material in the case of an electro-convective display. The colorant particle material should be able to hold a stable charge indefinitely so that repeated operation of the display does not affect the charge on the colorant particles. Colorant particle materials having a finite ability to hold a stable charge, however, can be used in accordance with the various embodiments while they maintain their charge. Colorant particles may have a size between several nanometers and several microns and have the property of changing the spectral composition of the incident light by absorbing and/or scattering certain portions of the spectrum. As a result, the particles appear colored, which provides a desired optical effect. In other embodiments, the colorant can be a dye, which is comprised of single absorbing molecules.

Electro-optical display 100a is in a clear optical state. The clear optical state is provided by applying a negative bias to first electrode 104 relative to a reference bias applied to second electrode 118. The negative bias applied to first electrode 104 provides an electrophoretic pull that attracts positively charged colorant particles 116. As a result, colorant particles 116 are compacted on the surface of opaque layers 110 within recess regions 108. With colorant particles 116 in clear fluid compacted on the surface of opaque layers 110 in recess regions 108, the clear optical state is achieved. In addition, due to opaque layers 110, colorant particles 116 do not tint electro-optical display 110a in the clear optical state.

The positively charged colorant particles 116 can be electrophoretically and convectively moved to first electrode 104 and held there by the negative bias applied to first electrode 104 relative to second electrode 118. In one embodiment, the convective flow is a transient effect caused by the ionic mass transport in carrier fluid 114, without charge transfer between carrier fluid 114 and first electrode 104. In this case, the convective flow proceeds for a finite amount of time and facilitates the compaction of colorant particles 116 on opaque layers 110 in recess regions 108. After compaction, colorant particles 116 are held on opaque layers 110 within recess regions 108 by electrostatic forces generated by a coupling with first electrode 104.

In another embodiment, the convective flow is induced by ionic mass transport in carrier fluid 114 and by charge transfer between the carrier fluid and first electrode 104 and second electrode 118. The charge transfer can occur when carrier fluid 114 is electrically coupled to the electrodes through direct contact with the electrodes or separated from the electrodes by an intermediate layer including one or more materials or by opaque layers 110. In the latter case, charge transfer is facilitated by the internal electrical conductivity of the intermediate layer, either volumetric or via pinholes and other defects.

Figure 1B:
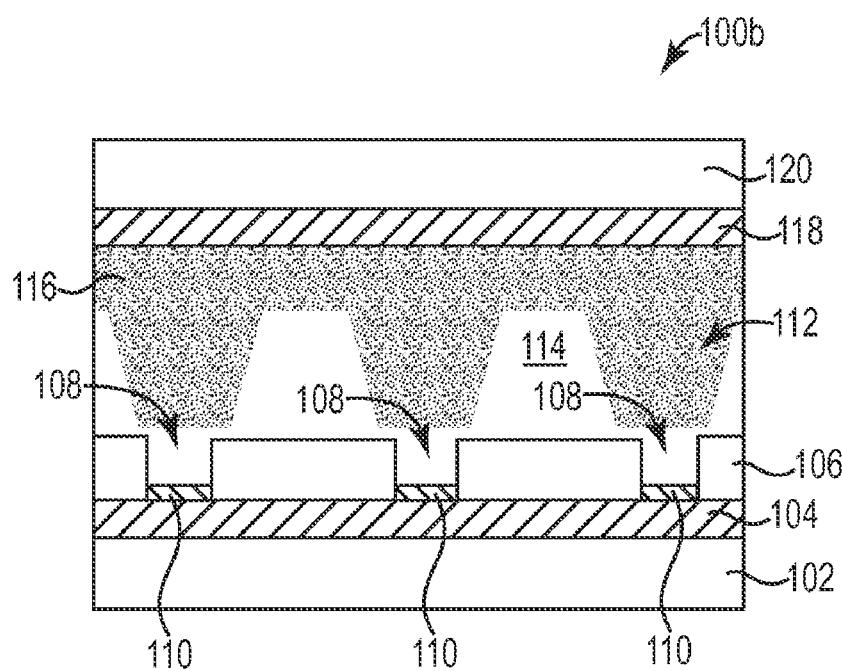
FIG. 1B illustrates a cross-sectional view of one embodiment of an electro-optical display in a spread optical state.

FIG. 1B illustrates a cross-sectional view of one embodiment of an electro-optical display 100b in a spread optical state. The spread optical state is provided by applying pulses or no bias to first electrode 104 relative to the reference bias applied to second electrode 118. The pulses or no bias applied to first electrode 104 spread colorant particles 116 throughout display cell 112. With colorant particles 116 in a clear fluid spread throughout display cell 112, the spread optical state having the color of colorant particles 116 is achieved.

Figure 2A:
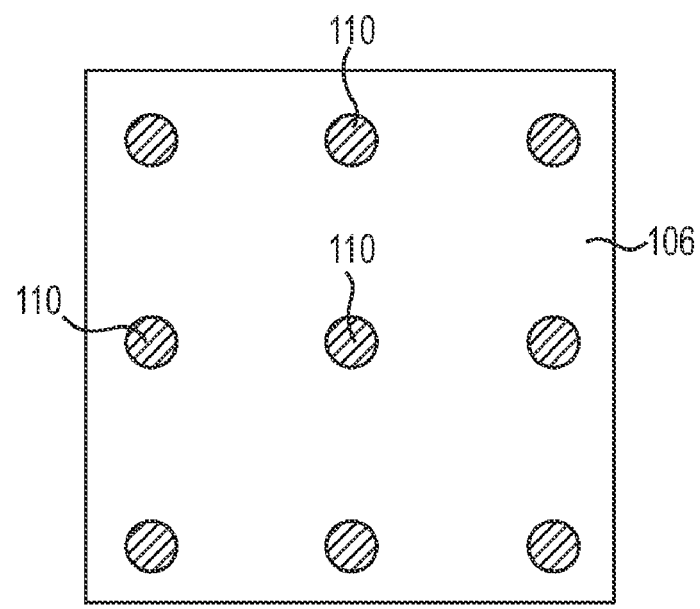
FIG. 2A is a top view illustrating one embodiment of opaque layers applied over an electrode of an electro-optical display.

FIG. 2A is a top view illustrating one embodiment of opaque layers 110 applied over an electrode of an electro-optical display. In one embodiment, the opaque layers 110 illustrated in FIG. 2A are used for opaque layers 110 in electro-optical display 100a previously described and illustrated with reference to FIG. 1A. As illustrated in FIG. 2A, opaque layers 110 are circular shaped and are self-aligned within circular shaped recess regions 108 of dielectric layer 106. By controlling the diameter of each recess region and the distance between adjacent recess regions, the clear aperture for the electro-optical display can be defined. In other embodiments, the circular shaped recess regions 108 are replaced with triangular shaped recess regions, square shaped recess regions, hexagonal shaped recess regions, diamond shaped recess regions, or other suitably shaped recess regions.

Figure 2B:
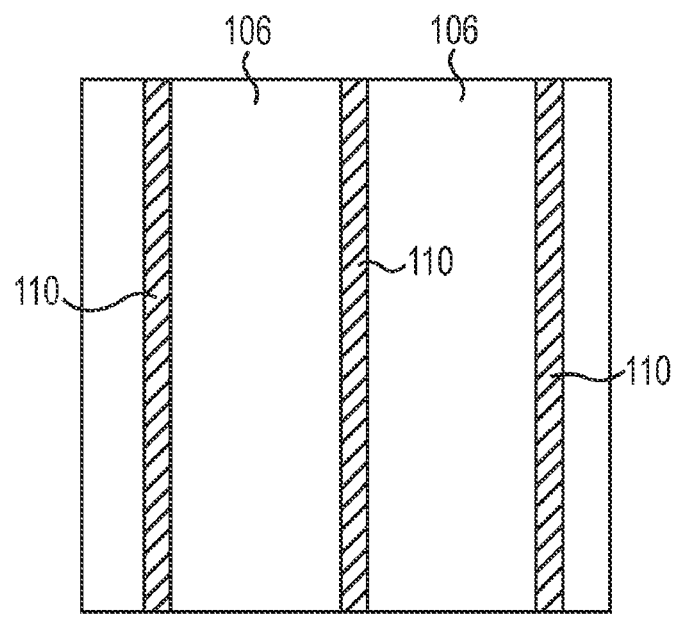
FIG. 2B is a top view illustrating another embodiment of opaque layers applied over an electrode of an electro-optical display.

FIG. 2B is a top view illustrating another embodiment of opaque layers 110 applied over an electrode of an electro-optical display. In one embodiment, the opaque layers 110 illustrated in FIG. 2B are used for opaque layers 110 in electro-optical display 100a previously described and illustrated with reference to FIG. 1A. As illustrated in FIG. 2B, opaque layers 110 are lines that are self-aligned within trench recess regions 108 of dielectric layer 106. By controlling the width of each recess region and the distance between adjacent recess regions, the clear aperture for the electro-optical display can be defined.

Figure 2C:
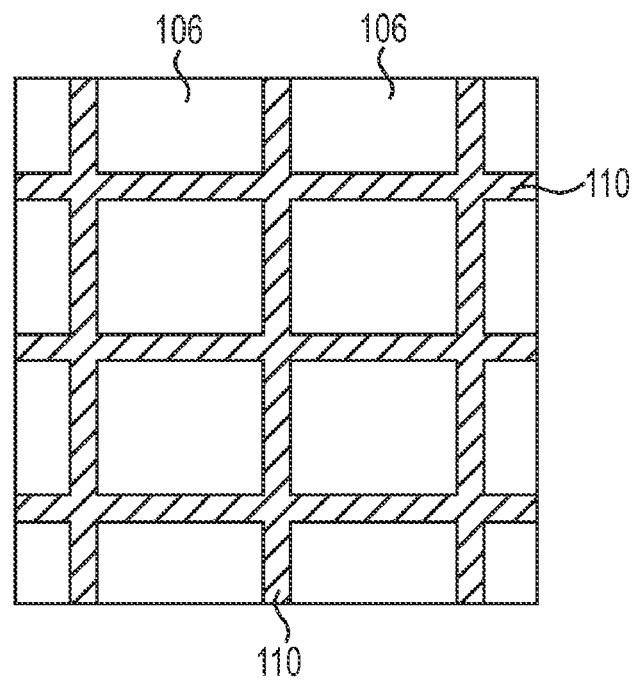
FIG. 2C is a top view illustrating another embodiment of an opaque layer applied over an electrode of an electro-optical display.

FIG. 2C is a top view illustrating another embodiment of an opaque layer 110 applied over an electrode of an electro-optical display. In one embodiment, the opaque layer 110 illustrated in FIG. 2C is used for opaque layers 110 in electro-optical display 100a previously described and illustrated with reference to FIG. 1A. As illustrated in FIG. 2C, opaque layer 110 provides a grid of intersecting lines that are self-aligned within intersecting trench recess regions 108 of dielectric layer 106. By controlling the width of each intersecting recess region and the distance between parallel trench regions, the clear aperture for the electro-optical display can be defined. While FIG. 2C illustrates opaque layer 110 including lines intersecting at 90° angles, in other embodiments, the lines may intersect at angles other than 90°.

Figure 2D:
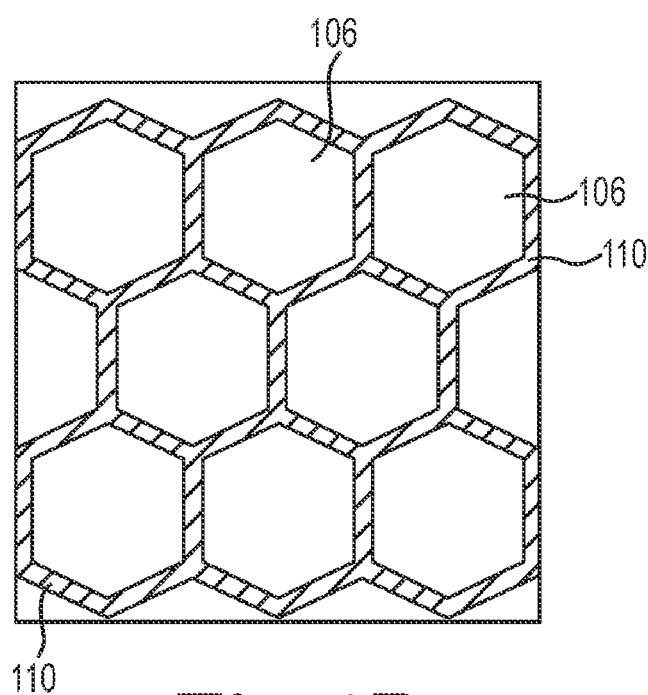
FIG. 2D is a top view illustrating another embodiment of an opaque layer applied over an electrode of an electro-optical display.

FIG. 2D is a top view illustrating another embodiment of an opaque layer 110 applied over an electrode of an electro-optical display. In one embodiment, the opaque layer 110 illustrated in FIG. 2D is used for opaque layers 110 in electro-optical display 100a previously described and illustrated with reference to FIG. 1A. As illustrated in FIG. 2D, opaque layer 110 provides a hexagonal lattice that is self-aligned within hexagonal lattice recess regions 108 of dielectric layer 106. By controlling the width of each recess region forming the hexagonal lattice and the diameter of each hexagon within the lattice, the clear aperture for the electro-optical display can be defined. In other embodiments, other suitably shaped lattice structures may be used for self-aligned opaque layer 110.

Figure 3A:
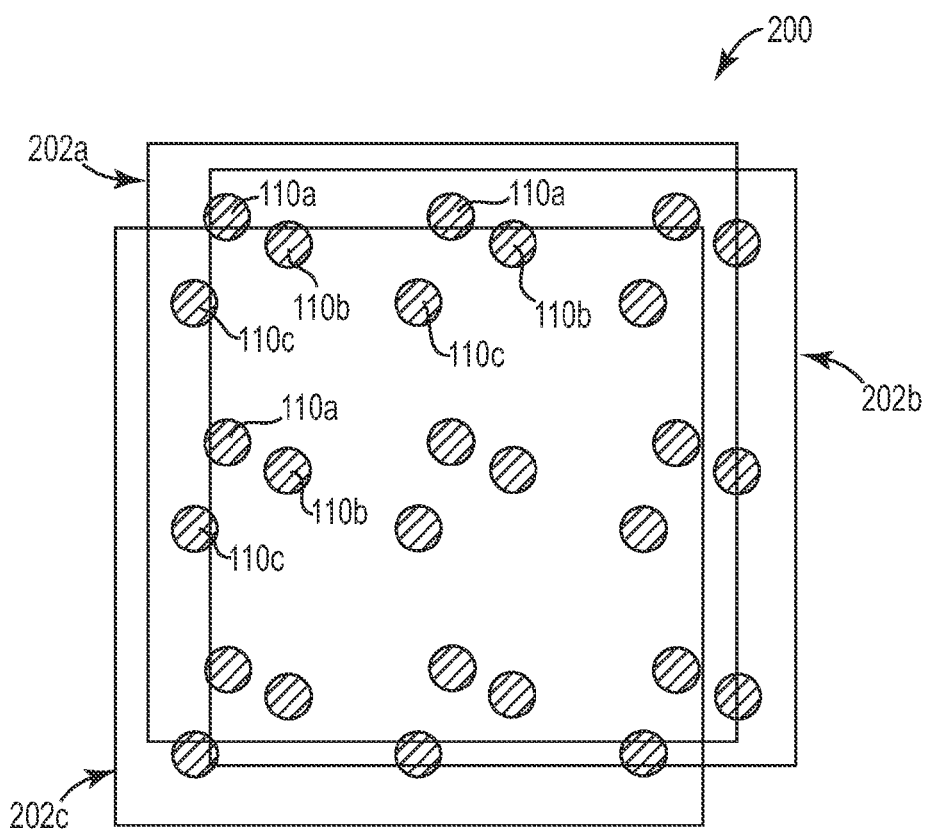
FIG. 3A is a top view illustrating one embodiment of opaque layers applied over electrodes of a stacked electro-optical display.
Figure 3B:
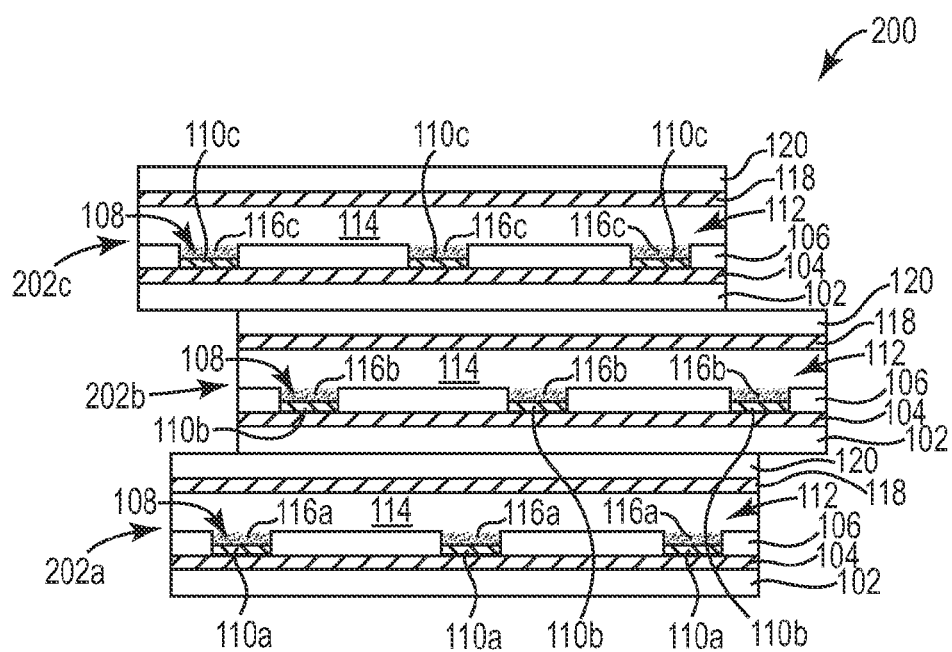
FIG. 3B illustrates a cross-sectional view of one embodiment of a stacked electro-optical display.

FIG. 3A is a top view illustrating one embodiment of opaque layers 110a, 110b, and 110c applied over electrodes 104 of a stacked electro-optical display 200. FIG. 3B illustrates a cross-sectional view of one embodiment of stacked electro-optical display 200. Electro-optical display 200 includes a first display element 202a, a second display element 202b, and a third display element 202c. Third display element 202c is stacked on second display element 202b, and second display element 202b is stacked on first display element 202a.

First display element 202a is similar to electro-optical display 100a previously described and illustrated with reference to FIG. 1A. First display element 202a includes circular shaped opaque layers 110a self-aligned within recess regions 108. First display element 202a also includes colorant particles 116a having a first color (e.g., cyan) for a full color electro-optical display.

Second display element 202b is similar to electro-optical display 100a previously described and illustrated with reference to FIG. 1A. Second display element 202b includes circular shaped opaque layers 110b self-aligned within recess regions 108. Second display element 202b also includes colorant particles 116b having a second color (e.g., magenta) for a full color electro-optical display.

Third display element 202c is similar to electro-optical display 100a previously described and illustrated with reference to FIG. 1A. Third display element 202c includes circular shaped opaque layers 110c self-aligned within recess regions 108. Third display element 202c also includes colorant particles 116c having a third color (e.g., yellow) for a full color electro-optical display. In other embodiments, colorant particles 116a, 116b, and 116c may include other suitable colors for providing an additive or subtractive full color electro-optical display.

In the embodiment illustrated in FIGS. 3A and 3B, first display element 202a, second display element 202b, and third display element 202c are offset from each other. As such, opaque layers 110a, 110b, and 110c are also offset from each other. In this embodiment, since recess regions 108 and self-aligned opaque layers 110a, 110b, and 110c are just a fraction of the total area of each display element 202a, 202b, and 202c, respectively, the clear aperture for stacked electro-optical display 200 remains high regardless of the alignment between display elements 202a, 202b, and 202c. As such, the process for fabricating stacked electro-optical display 200 is simplified. The self-aligned opaque layers 110a, 110b, and 110c prevent tinting of each display element due to colorant particles 116a, 116b, and 116c, respectively, in the clear optical state. Therefore, a stacked full color electro-optical display 200 having a bright, neutral white state and precise color control is provided.

Figure 4A:
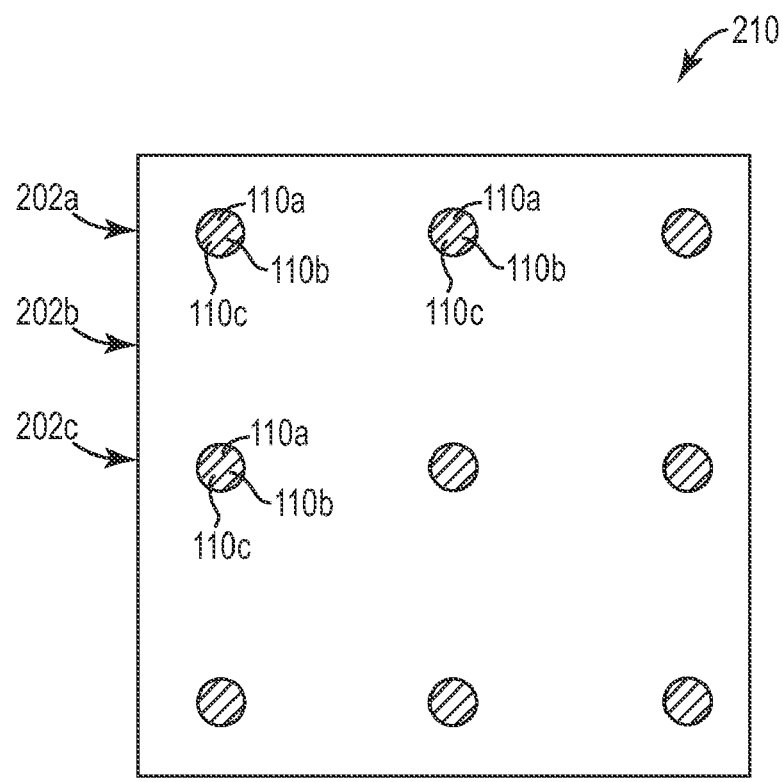
FIG. 4A is a top view illustrating another embodiment of opaque layers applied over electrodes of a stacked electro-optical display.
Figure 4B:
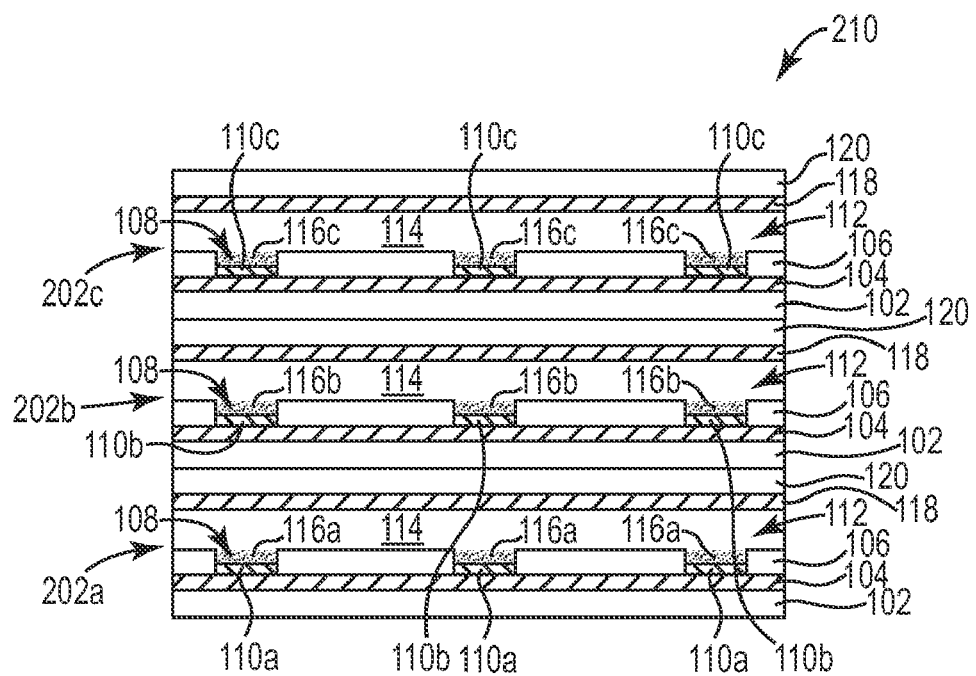
FIG. 4B illustrates a cross-sectional view of another embodiment of a stacked electro-optical display.

FIG. 4A is a top view illustrating another embodiment of opaque layers 110a, 110b, and 110c applied over electrodes 104 of a stacked electro-optical display 210. FIG. 4B illustrates a cross-sectional view of one embodiment of stacked electro-optical display 210. Electro-optical display 210 is similar to electro-optical display 200 previously described and illustrated with reference to FIGS. 3A and 3B, except that in electro-optical display 210 first display element 202a, second display element 202b, and third display element 202c are aligned with each other. As such, opaque layers 110a, 110b, and 110c are also aligned with each other. In this embodiment, since recess regions 108 and self-aligned opaque layers 110a, 110b, and 110c of each display element 202a, 202b, and 202c, respectively, are aligned, the clear aperture for stacked electro-optical display 210 is improved compared to stacked electro-optical display 200.

In another embodiment, one of opaque layers 110a, 110b, and 110c is used and the other two of opaque layers 110a, 110b, and 110c are excluded. Because of the alignment of first display element 202a, second display element 202b, and third display element 202c, a single opaque layer is sufficient to prevent tinting of each display element due to colorant particles 116a, 116b, and 116c, respectively, in the clear optical state.

Figure 5:
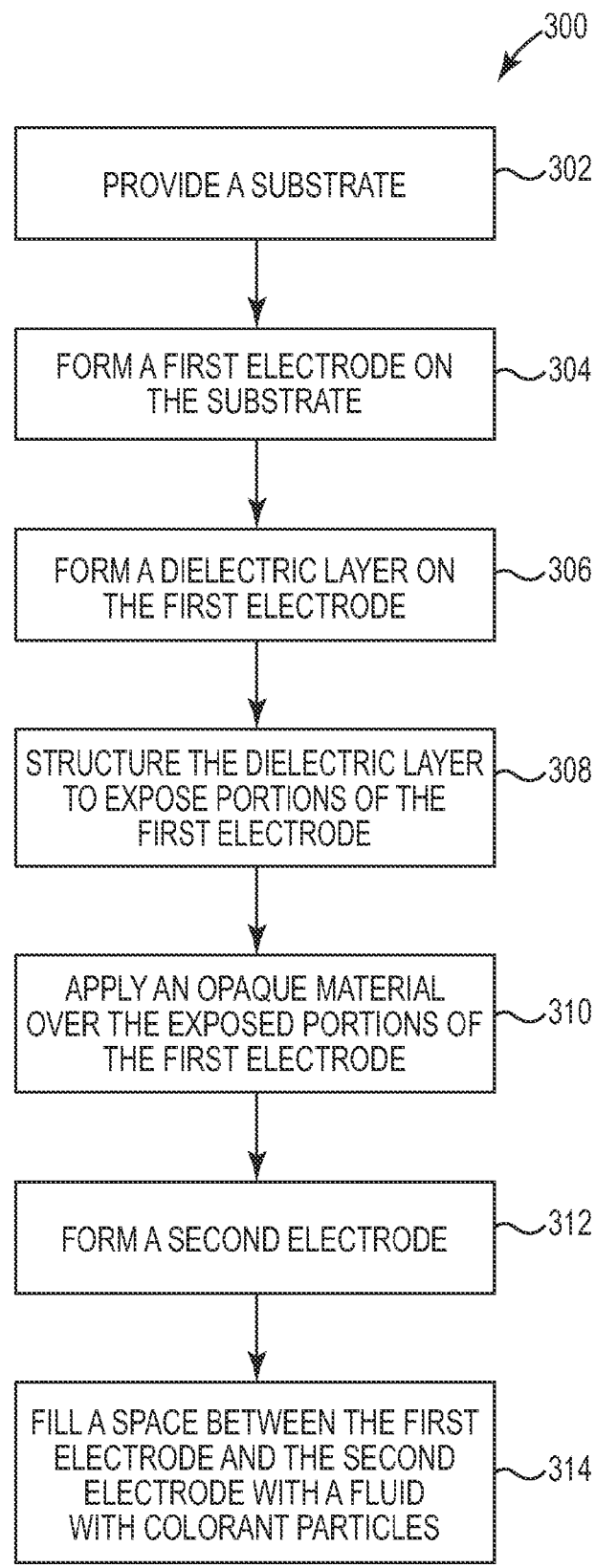
FIG. 5 is a flow diagram illustrating one embodiment of a method for fabricating an electro-optical display.

FIG. 5 is a flow diagram illustrating one embodiment of a method 300 for fabricating an electro-optical display. In one embodiment, method 300 is used to fabricate electro-optical display 100a previously described and illustrated with reference to FIG. 1A. At 302, a substrate, such as substrate 102 is provided. At 304, a first electrode, such as first electrode 104 is formed on the substrate. At 306, a dielectric layer is formed on the first electrode. In one embodiment, the dielectric layer is an ultraviolet (UV) curable resin.

At 308, the dielectric layer is structured to expose portions of the first electrode. In one embodiment, the dielectric layer is structured by stamping the dielectric layer to imprint recess regions, such as recess regions 108 into the UV curable resin to expose portions of the first electrode within the recess regions. The UV curable resin is then cured. In other embodiments, the dielectric layer is structured by a photolithography process, a micromachining process, a laser ablation process, or other suitable process.

At 310, an opaque material is applied over the exposed portions of the first electrode. In one embodiment, the exposed portions of the first electrode are electroplated with a metal, such as Ni, Cu, Au, Pd, or other suitable metal to provide opaque layers 110. In another embodiment, the exposed portions of the first electrode are anodized to provide the opaque material. In another embodiment, a dielectric material is applied over the exposed portions of the first electrode to provide the opaque material.

At 312, a second electrode, such as second electrode 118 is formed. In one embodiment, the second electrode is formed on a second substrate, such as second substrate 120 and then applied above the dielectric layer to form display cell 112. At 314, the space between the first electrode and the second electrode is filled with a carrier fluid with colorant particles, such as carrier fluid 114 with colorant particles 116.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display element comprising:
    a first electrode;
    a second electrode;
    a dielectric layer on the second electrode, the dielectric layer having recess regions therein;
    an opaque layer on the second electrode within each recess region; and
    a fluid with colorant particles between the first electrode and the second electrode.

2. The display element of claim 1, wherein the first electrode and the second electrode comprise a transparent conductor.

3. The display element of claim 1, wherein the opaque layer is black.

4. The display element of claim 1, wherein the opaque layer comprises a metal.

5. The display element of claim 1, wherein the opaque layer comprises anodized portions of the second electrode.

6. The display element of claim 1, wherein the opaque layer comprises a dielectric material.

7. The display element of claim 1, wherein the recess regions comprise one of circular shaped regions and trench regions.

8. A display comprising:
a first display element comprising:
   a transparent first electrode;
   a transparent second electrode;
   a transparent dielectric layer on the second electrode, the dielectric layer having recess regions therein;
   a self-aligned opaque layer on the second electrode within each recess region; and
   a fluid with colorant particles having a first color between the first electrode and the second electrode.

9. The display of claim 8, further comprising:
a second display element stacked on the first display element, the second display element comprising:
   a transparent first electrode;
   a transparent second electrode;
   a transparent dielectric layer on the second electrode, the dielectric layer having recess regions therein;
   a self-aligned opaque layer on the second electrode within each recess region; and
   a fluid with colorant particles having a second color between the first electrode and the second electrode.

10. The display of claim 9, wherein the recess regions of the first display element are offset from the recess regions of the second display element.

11. The display of claim 9, wherein the recess regions of the first display element are aligned with the recess regions of the second display element.

12. The display of claim 9, further comprising:
a third display element stacked on the second display element, the third display element comprising:
   a transparent first electrode;
   a transparent second electrode;
   a transparent dielectric layer on the second electrode, the dielectric layer having recess regions therein;
   a self-aligned opaque layer on the second electrode within each recess region; and
   a fluid with colorant particles having a third color between the first electrode and the second electrode.

13. The display of claim 12, wherein the first display element, the second display element, and the third display element provide a full color display.

* * * * *